United States Patent [19]

Komatsu

[11] Patent Number: 5,048,917
[45] Date of Patent: Sep. 17, 1991

[54] OPTICAL FIBER CONNECTOR AND METHOD WITH A MULTI-FERRULE STRUCTURE

[75] Inventor: Masao Komatsu, Tokyo, Japan

[73] Assignee: Adamant Kogyo Co., Ltd., Tokyo, Japan

[21] Appl. No.: 526,835

[22] Filed: May 22, 1990

[30] Foreign Application Priority Data

Oct. 18, 1989 [JP] Japan .................................. 1-271263

[51] Int. Cl.⁵ .............................................. G02B 6/26
[52] U.S. Cl. ...................................................... 385/78
[58] Field of Search ............... 350/96.20, 96.21, 96.22, 350/96.17, 320

[56] References Cited

U.S. PATENT DOCUMENTS

| | | | |
|---|---|---|---|
| 3,871,935 | 3/1975 | Gloge et al. ................ | 350/96.22 X |
| 4,046,454 | 9/1977 | Pugh, III ..................... | 350/96.21 |
| 4,167,303 | 9/1979 | Bowen et al. ................ | 350/96.21 |
| 4,312,564 | 1/1982 | Cefarelli et al. ............. | 350/96.22 |
| 4,487,474 | 12/1984 | Nishie et al. ................ | 350/96.21 |
| 4,708,433 | 11/1987 | Kakii et al. .................. | 350/96.22 |
| 4,753,515 | 6/1988 | Sato et al. ................... | 350/96.22 X |
| 4,895,425 | 1/1990 | Iwano et al. ................ | 350/96.20 |
| 4,915,469 | 4/1990 | Byron et al. ................ | 350/96.16 |
| 4,944,568 | 7/1990 | Danbach et al. ............ | 350/96.20 |
| 4,953,945 | 9/1990 | Nishimura et al. .......... | 350/96.22 |

FOREIGN PATENT DOCUMENTS

| | | | |
|---|---|---|---|
| 57-204016 | 12/1982 | Japan ......................... | 350/96.22 X |
| 58-72912 | 5/1983 | Japan ......................... | 350/96.22 X |
| 59-109012 | 6/1984 | Japan ......................... | 350/96.22 X |
| 60-57807 | 4/1985 | Japan ......................... | 350/96.21 X |
| 62-170928 | 7/1987 | Japan ......................... | 350/96.21 X |
| 62-247308 | 10/1987 | Japan ......................... | 350/96.20 X |
| 64-81920 | 3/1989 | Japan ......................... | 350/96.20 X |
| 64-180506 | 7/1989 | Japan ......................... | 350/96.20 X |

Primary Examiner—Brian Healy
Attorney, Agent, or Firm—Edward D. Manzo

[57] ABSTRACT

A multi-ferrule structure comprising a plurality of ferrule units each for a single optical fiber. The ferrule units are disposed in contact with an adjacent one(s) in such a way that the respective axes of the ferrule units are in parallel with each other in one and the same plane. The ferrule units make one multi-ferrule set. The maximum deviation of the distance between optical axis of the optical fibers inserted in the respective ferrule units of the multi-ferrule set is very small. When a number of optical fibers are connected with the same number of other photoconductive components by using the multi-ferrule structure, the positioning accuracy for abutting connection is remarkably improved. In addition, the multi-ferrule structure becomes small in size and compact one.

10 Claims, 7 Drawing Sheets

FIG_2

PRIOR ART

FIG_3

PRIOR ART

«5,048,917»

OPTICAL FIBER CONNECTOR AND METHOD WITH A MULTI-FERRULE STRUCTURE

FIELD OF THE INVENTION

The present invention relates to a multi-ferrule structure suitable for use in transmitting light propagating a plurality of optical fibers into a plurality of other photoconductive components.

BACKGROUND OF THE INVENTION

In connection with systems wherein information is transmitted by means of light, the technique of connecting optical fibers with various optical elements, that is, the optical connection technique, has been under research and development. Thus, a variety of optical connection devices have been proposed.

FIGS. 1 and 2 are schematic illustrations of the constructions of typical examples of conventional optical connection devices such as optical connectors for use in such optical connection.

FIG. 1 is a plan view of an optical connector with two cores, which is disclosed in Japanese Utility Model Application Laid-Open No. 4,406/1989. This optical connector is of such a construction that a pair of assemblies each having tips of single optical cables 10a and 10b (the tips are usually parts consisting of a core portion and a clad portion except for a covering for a core wire, and are also referred to as "terminal strands of optical fibers,") inserted into respective ferrule units 12a and 12b (in a cylindrical form) are disposed and fixed in a housing 14 with such a distance therebetween that the ferrule units 12a and 12b cannot come into contact with each other.

FIG. 2 is a perspective view of the plug of a multi-core optical fiber connector as disclosed in Japanese Patent Application Laid-Open No. 72,912/1983. A number of optical fibers 16a, 16a, 16c and 16d have the terminal strands thereof inserted into respective ferrule units 18a, 18b, 18c and 18d, which are attached to a plug body 22 in such a way as to pass through corresponding through-holes 20a, 20b, 20c and 20d provided in a plug base. In this conventional example as well, the ferrule units are disposed with such a distance therebetween that they cannot come into contact with each other.

Meanwhile, the core diameter of the core wires of optical fibers is usually in the range of about 4 μm to about 50 μm, while the outer diameter of clad portions around cores is generally about 100 μm. Ferrule units to highly accurately position and fix the terminal strands of optical fibers having such an outer diameter include metallic ferrules, ceramic ferrules, and plastic ferrules, among which ceramic ferrules are now predominantly used since they are especially excellent in strength, final processing accuracy, connection characteristics, etc. All of such ferrules are usually in a cylindrical form.

In every one of these ferrules, a very small through-hole is provided to allow the terminal strand of an optical fiber having an axis in common therewith to be inserted and fixed thereinto. In the case of zirconia ceramic ferrules, an eccentricity of about +0.5 to about +0.1 μm, usually around +0.2 μm, is now secured when the outer diameter of the ferrules is usually set to be as small as about 1.5 mm.

In a construction wherein such ferrules capable of from but parallel to each other, as in the conventional optical connectors described in connection with FIGS. 1 and 2, a housing or the like for fixation of the ferrules must be provided with holes for such fixation. Such holes are poor in positioning accuracy, with the result that the accuracy of distance between the axes of adjacent ferrules arrayed is usually at least +10 μm, while the best attainable accuracy is around +3 μm. The accuracy is not good for optical connection.

When the accuracy of inter-axis distance is of such a degree, connection of optical fibers (represented by reference numeral 32) with an optical element-cum-photoconductive components 30 such as an optical switch, an optical coupler, an optical sensor, an optical gate or other optical integrated circuit, for example, as shown in FIG. 3, entails a poor positioning accuracy of at least +3 μm for connection of the optical fibers 32 with, for example, light wave guides (represented by reference numeral 34) formed in the optical element 30, Hence the connection loss attributed to deviations of the axes of the light wave guides from the axes of the optical fibers is increased. Reference numeral 36 in FIG. 3 designates optical switch portions.

As a result of extensive investigations and experiments, the present inventors have reached a conclusion that, when use is made of a multi-ferrule structure wherein a plurality of ferrule units capable of highly accurately positioning and fixing an optical fiber are juxtaposed and fixed themselves in contact with an adjacent one(s) and in parallel with each other in the case where a plurality of optical fibers are respectively connected with a corresponding number of photoconductive components such as optical fibers for connection therewith or light wave guides formed in an optical element, the accuracy of distance between the axes of ferrule units respectively disposed on both ends of the structure can be improve, let alone the accuracy of distance between the axes of mutually adjacent ferrule units, as compared with the conventional level of such accuracy, since it depends on the eccentricity of the ferrule units themselves. The positioning accuracy for connection of the optical fibers with the photoconductive components can also be improved accordingly.

Thus, an object of the present invention is to provide a multi-ferrule structure for optical fibers which is capable of heightening the positioning accuracy for connection of a plurality of optical fibers with a plurality of photoconductive components.

SUMMARY OF THE INVENTION

The above-mentioned object can be attained by either of the following embodiments of the present invention.

In accordance with the first embodiment of the present invention, a multi-ferrule structure comprises a plurality of ferrule units each for a single optical fiber. Adjacent ferrules contact each other in such a way that the respective axes thereof are parallel to each other in one and the same plane.

In accordance with the second embodiment of the present invention, there is provided a multi-ferrule structure comprising:

a base plate with a flat upper surface;

a positioning base block fixed on the upper surface of the base plate;

a plurality of ferrule units of the same outer diameter for a single optical fiber which are disposed in contact with an adjacent one(s) and in parallel with each other on the flat upper surface of the base plate through positioning thereof with the flat upper surface of the base plate and the base block; and a fixing part fixing the ferrule units.

In carrying out the second embodiment, it is preferable that the base block be provided vertical to the flat upper surface of the base plate.

According to a preferable example of the second embodiment, the end face of the base plate on the side of the abutting end faces (abutting surfaces) of the optical fibers are vertical to the above-mentioned flat upper surface of the base plate, while the above-mentioned base block is disposed along a direction perpendicular to the above-mentioned end faces.

In carrying out the second embodiment, it is preferable that the aforementioned fixing part comprises:

a first block provided on the flat upper surface of the above-mentioned base plate in contact with a ferrule unit remotest from the above-mentioned base block; and a second block checking the movement of the ferrule units from the side opposite to the base plate.

According to another preferable example of the second embodiment, the above-mentioned fixing part further comprises a resin layer(s) preferably made of a synthetic resin and integrally fixing all the ferrule units.

In every multi-ferrule structure as described above, the ferrule units constituting the structure is preferably made of a ceramic material, and particularly made of a zirconia ceramic material.

The multi-ferrule structure of the present invention is of such a construction that a plurality of ferrule units not only capable of being produced with a small eccentricity but also capable of highly accurately fixing a terminal strand of an optical fiber are disposed in contact with or in close contact with an adjacent one(s) in such a way that the axes thereof are arrayed in one and the same plain, parallel to each other, and within the tolerance limits Therefore, the accuracy of the distance between the axes of the two outermost ferrule units depends solely on the eccentricity of the individual ferrule units, as does the accuracy of the distance between the axes of adjacent ferrule units. Accordingly, the accuracy of such inter-axis distance can be improved to a very large extent. In addition, the invented multi-ferrule structure is small in size and compact relative to the prior art.

When a plurality of ferrule units of the same diameter are to be juxtaposed in contact with an adjacent one(s) to form a multi-ferrule structure, a positioning base block to serve as a basis of positioning of the ferrule units is preliminarily fixed on the highly smooth upper surface of a base plate for installation of ferrules. Then the ferrule units are juxtaposed on the upper surface of the base plate in contact with an adjacent one(s), followed by such positioning of the whole groups of the ferrule units that the ferrule unit on the side of the base block is pressed against the base block as well as the upper surface of the base plate with a pressure applied to the outermost ferrule unit on the side opposite to the above-mentioned ferrule unit. Thereafter, the ferrule units are fixed by an adequate means.

Insertion and fixation of the terminal strands of the optical fibers into the corresponding ferrule units may be done either before or after assembling of the multi-ferrule structure.

Uniform arrangement of the abutting end faces of all the ferrule units to constitute the multi-ferrule structure may be done using a block gauge as usual.

BRIEF DESCRIPTION OF THE DRAWINGS

The foregoing and other objects and features of the present invention will be better understood by reference to the following description taken in connection with the accompanying drawings, in which.

PREFERRED EMBODIMENT OF THE INVENTION

Examples of the multi-ferrule structure of the present invention will now be described while referring to the accompanying drawings.

It is to be appreciated that the figures are schematically drawn with respect to the sizes and shapes of constituents and the positional relationship therebetween to merely facilitate the understanding of the present invention, while numerical conditions exemplified in the following examples are merely preferred ones. Thus, it should be understood that the following examples should not be construed as limiting the scope of the present invention.

Figure 4:
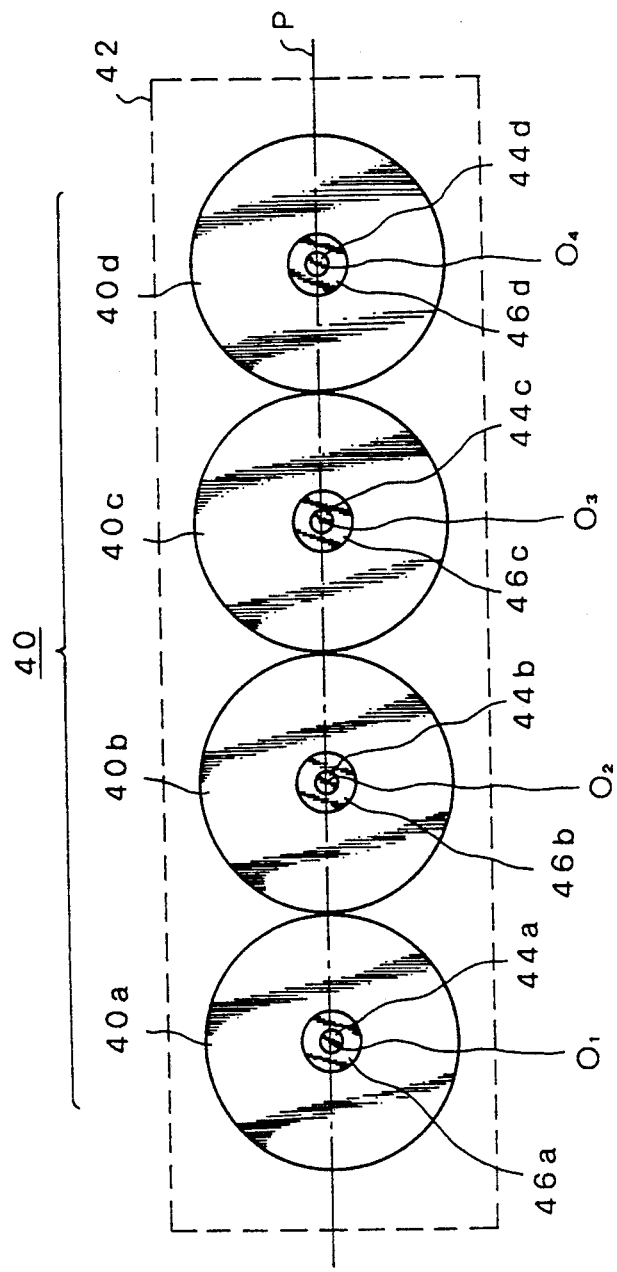
FIG. 4 is schematic enlarged front view of a multi-ferrule set, which is illustrative of the multi-ferrule structure according to the first embodiment of the present invention.
Figure 5:
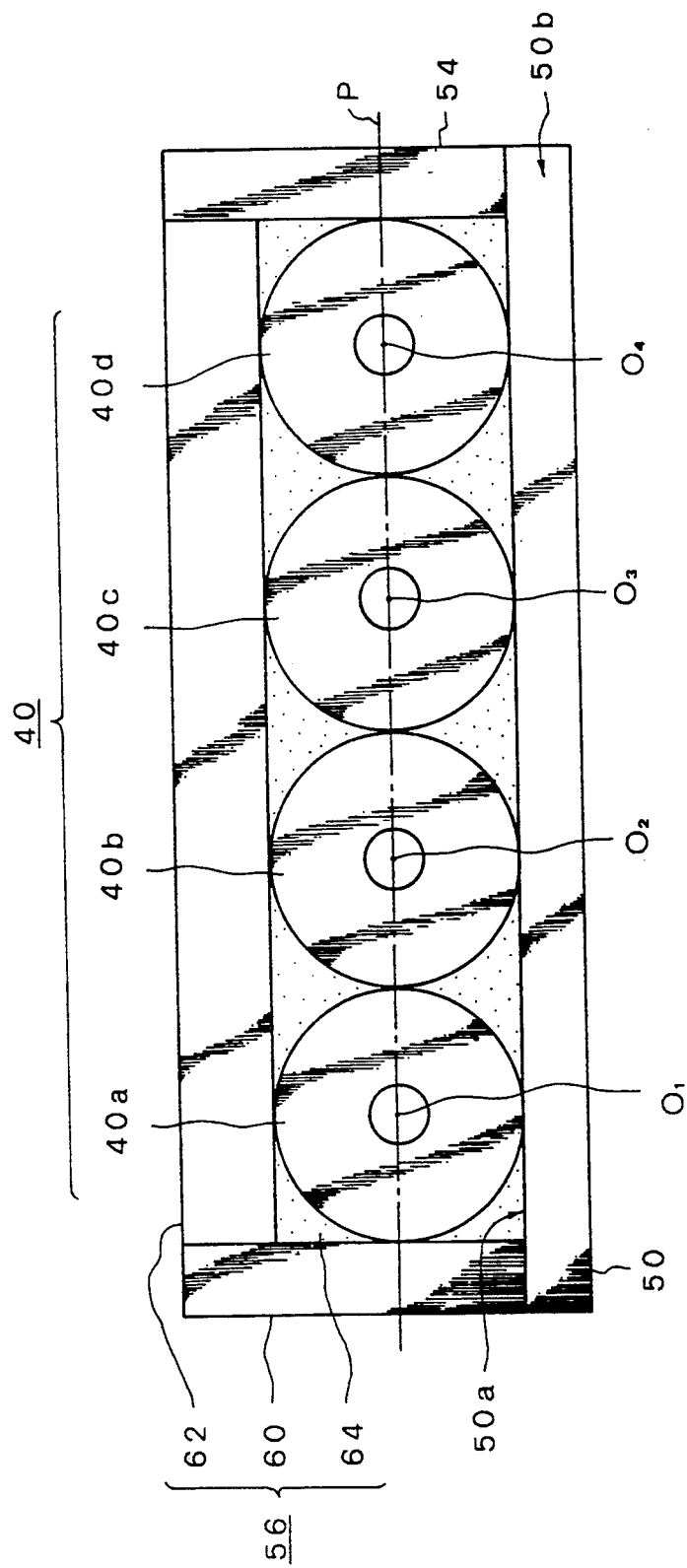
FIG. 5 is a schematic enlarged front view of a multi-ferrule set, which is illustrative of the multi-ferrule structure according to the second embodiment of the present invention.

FIGS. 4 and 5 are enlarged schematic front views of examples of the multi-ferrule structure of the present invention, when viewed from the side of the abutting end faces of optical fibers. In the following examples, preferred description of the multi-ferrule structure, ceramic ferrule units will be described since the ceramic ferrules are now predominantly used as already described.

Figure 1:
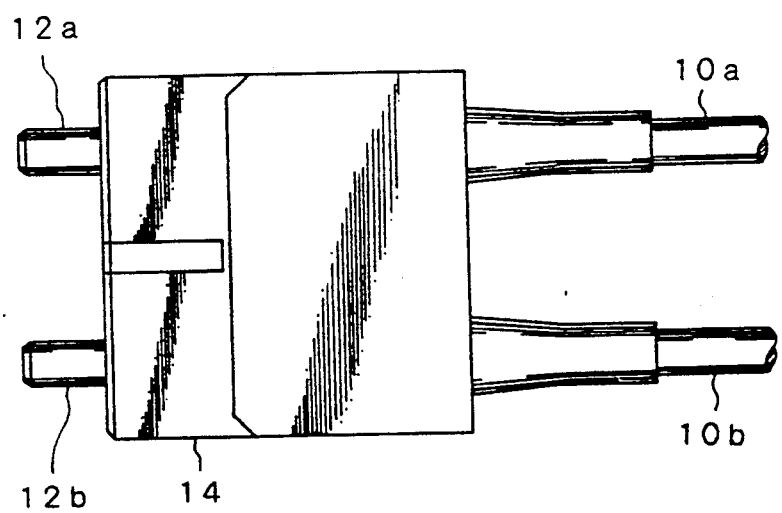
FIG. 1 is a schematic plan view of a conventional optical connector.
Figure 2:
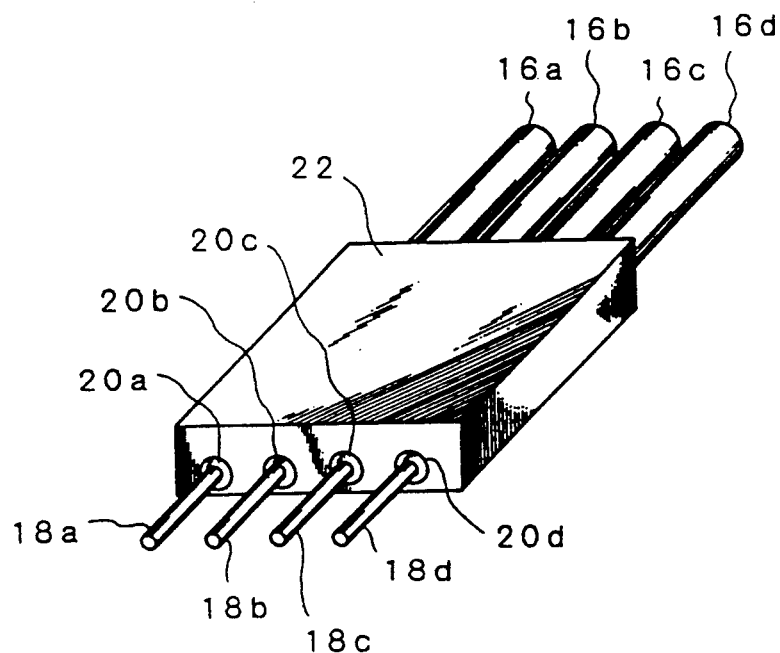
FIG. 2 is a schematic perspective view of another conventional optical connector.
Figure 3:
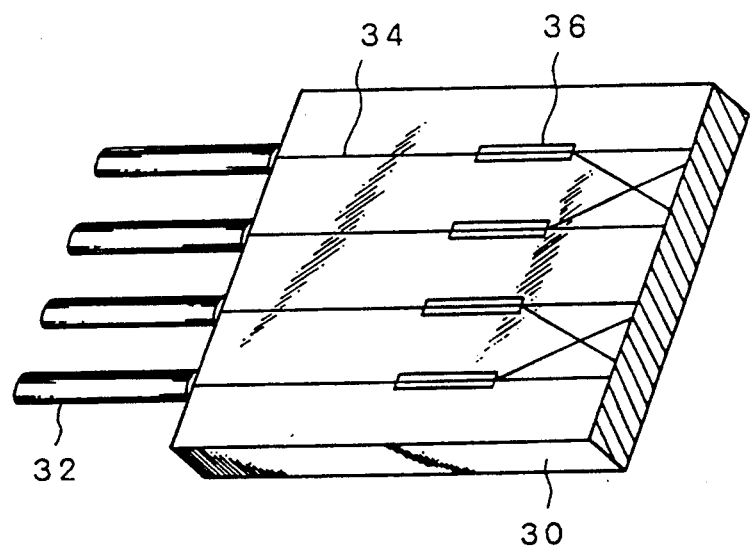
FIG. 3 is a schematic perspective illustration, which is illustrative of a conventional method of connecting optical fibers with an optical element.

First, the multi-ferrule structure according to the first embodiment of the present invention will be described while referring to FIG. 1. A plurality of (for example, four) zirconia ferrules 40a, 40b, 40c and 40d (represented by reference numeral 40) as ferrule units each for a single optical fiber can be disposed in contact with an adjacent one(s) in such a way that the respective axes $O_1$, $O_2$, $O_3$ and $O_4$ thereof are juxtaposed parallel to each other in one and the same plane P. In this illustrative embodiment, the diameter of the core portions of these ferrule units 40 is 9 μm and the diameter of the clad portions including the respective core portions is 100 μm, while the outer diameter of the ferrule units is 1.5 mm +0.5 μm (eccentricity: +0.5 μm). Here, the group of these ferrule units 40 are referred to as a "multi-ferrule set 42" and the multi-ferrule structure of the present invention is constituted either only of the multi-ferrule set 42 itself or mainly of the multi-ferrule set in this example. In the figure, the individual ferrule units 40 constituting the multi-ferrule set 42 are shown to have the terminal strands of respective optical fibers inserted thereinto to fix the terminal strands of the optical fibers, which have respective core portions 44a, 44b, 44c and 44d, and respective clad portions 46a, 46b, 46c and 46d. Thus, the of distance between the axes of the two outermost ferrule units is accurate to within $0.5 \times 4 = 2$ μm in the worst case, while the distance between the axes of mutually adjacent ferrule units, for example, 40a and 40b, is 1 μm in the worst case. These accuracies are remarkably high, as Variation in distance between the axes of laterally adjacent ferrules should be at most ±3 μm so that when the optical fibers within these ferrules, forming a connector, are abutted against respective photoconductive components the connection loss due to misalignment is kept at a low level especially preferable that the distance between the axes of mutually adjacent ferrule units be accurate to within +0.5 μm.

Figure 6:
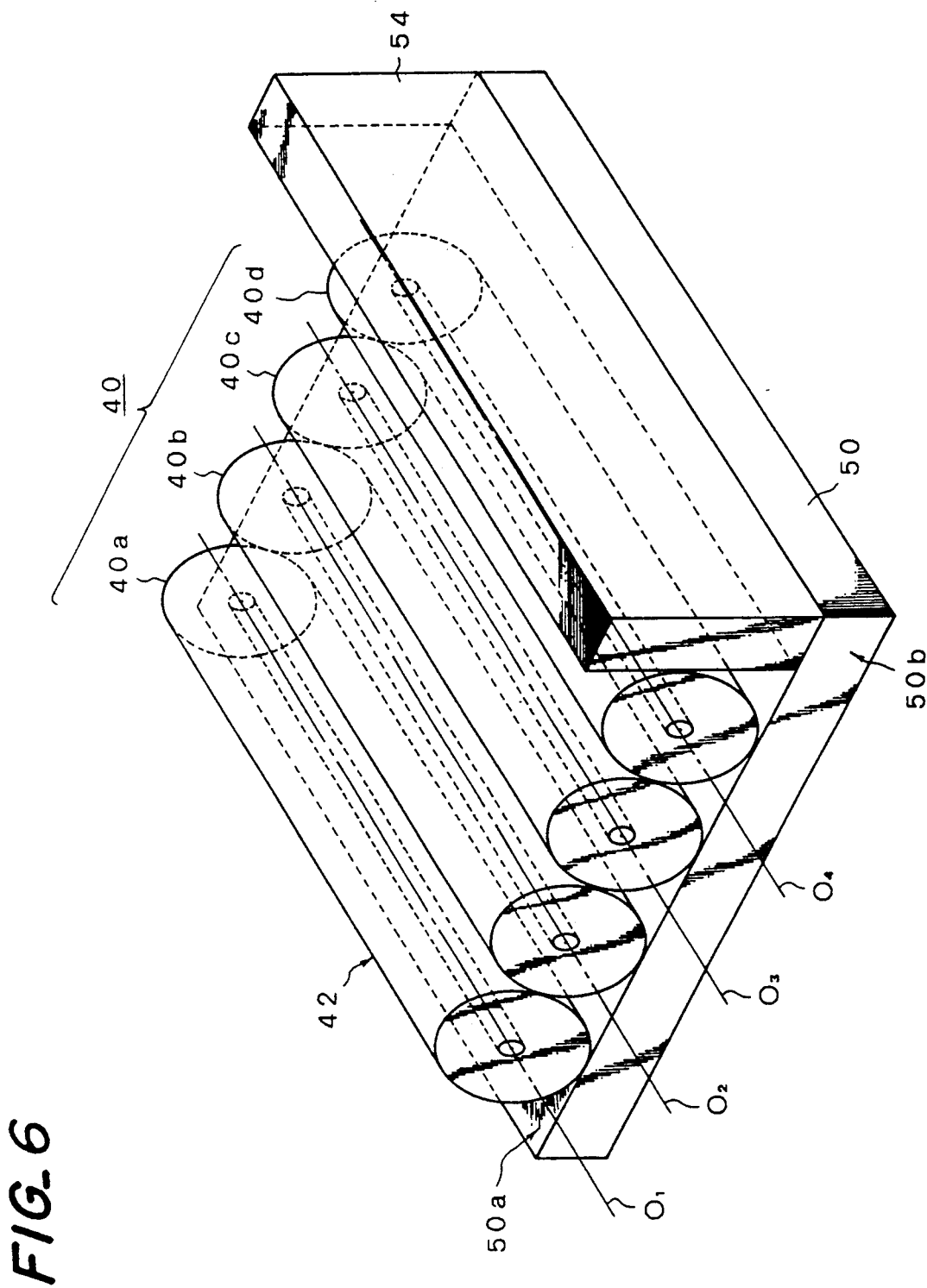
FIG. 6 is a schematic enlarged perspective view of the essential part of the multi-ferrule structure according to the second embodiment of the present invention.

Attention is now directed to FIGS. 5 and 6.

FIG. 5 is a schematic enlarged front view of the multi-ferrule structure according to a second embodiment of the present invention, wherein ferrule units are actually positioned highly accurately to constitute a multi-ferrule set 42 as described above. FIG. 6 is a perspective view of the multi-ferrule structure of FIG. 5 with a fixing part excluded therefrom. These figures show the ferrule units 40 not having the respective terminal strands of the optical fibers inserted thereinto.

This multi-ferrule structure is of a construction comprising a base plate 50 with a flat upper surface for installation of ferrules, a positioning base block 54 fixed on the upper surface 50a of the base plate 50, a plurality of ferrule units 40 (40a, 40b, 40c and 40d) of the same outer diameter each for a single optical fiber, and a fixing part 56 fixing the ferrule units 40 (corresponding to a multi-ferrule set 42).

In this case, the upper surface 50a of the base plate 50 has been subjected to abrasive finishing to form a highly smooth flat surface as free of unevenness as possible. The base plate 50 is usually made of a ceramic material. It is preferable that the end face 50b of the base plate 50 on the side of the abutting end faces of the optical fibers be perpendicular to the upper surface 50a thereof.

The base block 54 is fixed on the upper surface 50a of the base plate 50. This base block 54 serves as a basis for determining the extending directions (orientation) as well as positions of the ferrule units. Accordingly, the base block 54 is preferably made to have a flat side surface of a certain length on the side of the ferrule units 40. The base block 54 is preliminarily positioned and fixed on the upper surface 50a of the base plate 50 in such a direction as to juxtapose the axes $O_1-O_4$ of the ferrule units 40 parallel to each other. In this sense, the side surface of the base block 54 itself on the side of the ferrule units may be either perpendicular to the upper surface 50a of the base plate 50 or aslant at a certain angle as desired. The extending direction of the base block 54 and hence the extending directions of the axes $O_1-O_4$ of the ferrule units 40 are preferably perpendicular to the end face 50b of the base plate 50. However, this is not always necessary. Thus, the base block 54 and hence the axes $O_1-O_4$ of the ferrule units 40 may be fixed aslant at a given angle. In the latter case, the abutting end faces of the ferrule units 40 may be subjected to processing such as polishing if necessary after assembling thereof in order to effect even or uniform arrangement of the abutting end faces of the ferrule units 40. The positioning base block 54 is also preferably made of a ceramic material.

Subsequently, members 40a, b, c and d of the ferrule unit 40 are arrayed on the upper surface 50a of the base plate 50, as shown in FIG. 6. A pressure or force, for example, from the side of the outermost ferrule unit 40a is applied toward the side of the innermost ferrule unit 40d to press the ferrule units 40 against the upper surface 50a of the base plate 50 and the positioning base block 54 to set the ferrule units 40 constituting the multi-ferrule set 42. Alternatively, the individual ferrule units 40 are each pressed sideways toward base block 54 and/or from above to effect the invented configuration. Either of the foregoing operations allows the ferrule units 40 to be positioned and juxtaposed parallel to each other and in contact with an adjacent one(s) by means of the upper surface 50a of the base plate 50 and the base block 54, while at the same time juxtaposing the axes $O_1-O_4$ of the ferrule units 40 parallel to each other in one and the same plane as determined by the baseplate 50 and base block 54.

Subsequently, the multi-ferrule set 42 thus formed is fixed in position using an adequate fixing part 56 to form the multi-ferrule structure. In this example, the fixing part preferably comprises at least a first block 60 provided on the upper surface 50a of the base plate 50 in such a way as to be in contact with the outermost ferrule unit 40a (most remote from the base block 54, and a second block 62 pressing the ferrule units 40 toward base plate 50. Such first and second blocks 60 and 62 press the ferrule units 40 against the base plate 50 and the base block 54 at a pressure adequate to position the ferrule units 40 in close contact therewith. Either without or in addition to the first and second blocks 60 and 62, a resin layer(s) 64 made of, for example, a synthetic resin may be provided in such a way as to integrally fix the whole of the multi-ferrule set 42. The configuration, material(s), etc. of the fixing part 56 are not particularly restricted, and may be varied by the skilled artisan to achieve the arragement described supra.

In the case of the second embodiment as well, insertion and fixation of the terminal strands of the optical fibers into the respective ferrule units 40 of the multi-ferrule set 42 may be done either before or after the assembling of the multi-ferrule structure.

The abutting end faces of the ferrule units of the multi-ferrule set 42 may be subjected to the same finishing operation as made for conventional ferrule structures, for example, abrasive finishing to effect the finishing of those end faces. This finishing operation may be effected either before or after the insertion of the terminal strands of the optical fibers.

The final abutting end faces of the multi-ferrule set 42 after fixing of the optical fibers into the respective ferrule units 40 may either of a so-called PC (physical contact) type or in the form of a flat surface or other shape. Micro optical elements such as microlenses (not shown in the figure) may t,e attached to the above-mentioned end faces.

While the foregoing examples are concerned with cases where four ferrule units are juxtaposed in the same plane in such a way that the outer wall faces thereof are in contact with an adjacent one(s), it must be appreciated that the number of ferrule units may be two or more.

The multi-ferrule set is preferably composed of ferrule units of the same outer diameter in combination. However, this is not always necessary. Any configuration will suffice in so far as the axes of ferrule units are juxtaposed parallel to each other in one and the same plane.

As described hereinbefore, the multi-ferrule structure of the present invention is of such a construction as will be suitable for use in a planar parallel arrangement of a plurality of optical fibers to effect optical connection thereof. A case where optical fibers are connected with the light wave guides of an optical element by using such a multi-ferrule structure will now be briefly described while referring to FIG. 7.

Figure 7:
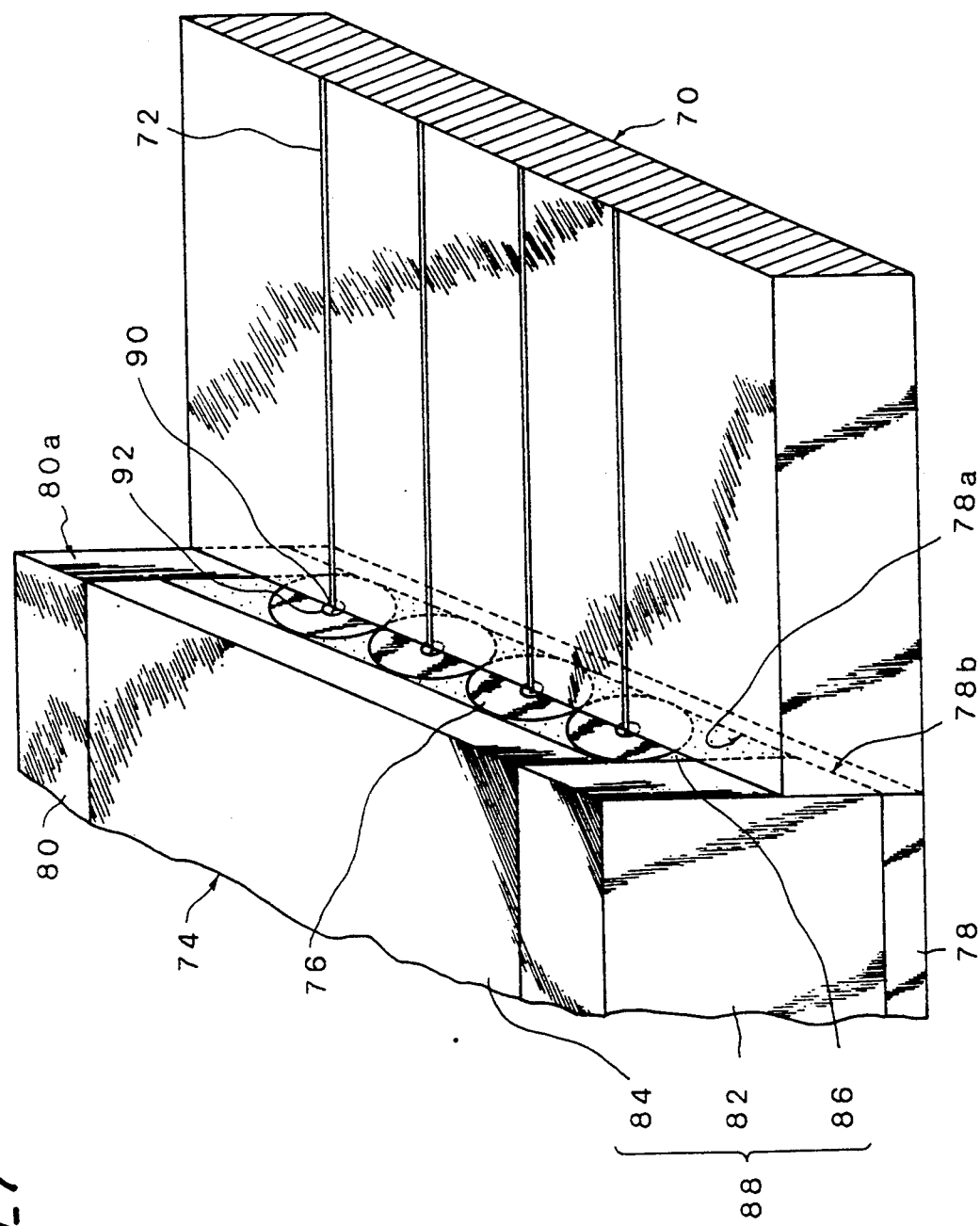
FIG. 7 is a schematic perspective illustration, which is illustrative of an optical connection method of connecting optical fibers with the light wave guides of an optical element by using a multi-ferrule structure according to the present invention.

In FIG. 7, an optical element 70 (only a constituent part of which is shown in the figure) is provided with, for example, four light wave guides (represented by reference numeral 72) according to a customary method. The distance between the optical axes of adjacent light wave guides 72 is set to be, for example, 1.5 mm +0.5 μm. On the other hand, a multi-ferrule structure 74 has a construction comprising four ferrule units (represented by reference numeral 76) of 1.5 mm+0.2 μm in outer diameter positioned with a base block 80 in cooperation with the flat upper surface 78a of a base plate 78 and fixed on the flat upper surface 78a of the base plate 78 by means of an adequate fixing part 88 (consisting of first and second check blocks 82 and 84 in the form of a plate and resin layers 86). Optical fibers are respectively inserted and fixed into the ferrule units 76 to form an optical fiber connector. The abutting end face of the optical fibers (consisting of a core portion 90 and a clad portion 92), the end face 78b of the base plate 78, and the end face 80a of the base block 80 are arranged to be flat. The abutting end faces of the optical fibers are allowed to abut against the optical element 70 in such a way that the core portions 90 of the optical fibers respectively abut the light wave guides 72 of the optical element 70. In such a state, the multi-ferrule structure and the optical element are affixed to each other.

While the foregoing examples have been described in connection with the case of using zirconia as the material of ferrules, alumina or other adequate ceramic material may be used to form each ferrule.

The core wires of optical fibers must be inserted into the respective ferrule units of the multi-ferrule structure according to the present invention. The insertion of the core wires into the respective ferrule units may be done either before or after assembling of the multi-ferrule structure.

The multi-ferrule structure according to the present invention may be produced through fixation of the ferrule units with a resin layer(s). Examples of resins usable in this case include epoxy resins, ultraviolet-curable resins, cold-setting resins, and thermosetting resins As will be apparent form the foregoing description, since the multi-ferrule structure of the present invention has a construction comprising ferrule units disposed in contact with an adjacent one(s) in such a way that the axes thereof are juxtaposed in parallel to each other in one and the same plane, the deviation of distance between the axes of the ferrule units, and hence the deviation of distance between the central axes (optical axes) of the terminal strands of optical fibers, when inserted and fixed into the corresponding ferrule units, depend solely on the eccentricity of the ferrule units. Since the eccentricity of the ferrule units is very small, the maximum deviation of the distance between the above-mentioned central axes which is controlled by the multi-ferrule set is very small as compared with those in the case of the conventional optical connection devices. Accordingly, when a number of optical fibers are connected with the same number of other photoconductive components by using the multi-ferrule structure of the present invention, the positioning accuracy for abutting connection is remarkably improved. Therefore, when the multi-ferrule structure of the present invention is used to form an optical connection device for optical fibers, such as optical connectors, the connection loss of light is remarkably decreased as compared with conventional optical connection devices.

What is claimed is:

1. A multi-ferrule structure comprising:
   a base plate with a flat upper surface;
   a positioning base block fixedly fastened to extend from said flat upper surface of said base plate;
   a plurality of ferrule units of the same outer diameter each for a single optical fiber and each disposed in contact with an adjacent one and parallel to each other, the ferrule units being positioned on the flat upper surface of said base plate, one of said ferrules abutting said base block; and
   a fixing part fixing the position of said ferrule units.

2. A multi-ferrule structure as claimed in claim 1, wherein said base block is position is normal to the flat upper surface of said base plate.

3. A multi-ferrule structure as claimed in claim 1, wherein said base plate includes an end face on the side of the abutting end faces of optical fibers normal to the flat upper surface of said base plate, and wherein said block is provided along a direction perpendicular to said end face of said base block.

4. A multi-ferrule structure as claimed in claim 1, wherein said fixing part comprises:
   a first block provided on the flat upper surface of said base plate in such a way as to abut the ferrule unit most remote from said base block;
   a second block pressing said ferrule units toward said base plate.

5. A multi-ferrule structure as claimed in claim 1, wherein said fixing part further comprises a resin layer(s) integrally fixing said ferrule units.

6. A multi-ferrule structure as claimed in claim 1, wherein said ferrule units are made of a ceramic material.

7. A multi-ferrule structure according to claim 1 wherein said fixing part comprises a resin contact said ferrule units.

8. An optical fiber assembly comprising a set of fixedly fastened parallel ferrules, each for a single optical fiber, the ferrules being configured side-by-side with laterally adjacent ferrules abutting each other.

9. The assembly of claim 8 wherein the single optical fibers in said set of ferrules all lie in a single plane and are parallel to each other.

10. A method of organizing optical fibers for coupling comprising the steps of:
    providing a plurality of ferrule units, each ferrule corresponding to a fiber;
    positioning the plurality of ferrule units upon a flat surface;
    pressing the ferrule units into side-by-side abutment, each unit being parallel to the others; then
    fixing the position of the ferrule units.

* * * * *